(12) United States Patent
Nystad

(10) Patent No.: US 10,593,093 B2
(45) Date of Patent: Mar. 17, 2020

(54) DATA PROCESSING SYSTEMS

(71) Applicant: Arm Limited, Cambridge (GB)

(72) Inventor: Jorn Nystad, Trondheim (NO)

(73) Assignee: Arm Limited, Cambridge (GB)

( * ) Notice: Subject to any disclaimer, the term of this patent is extended or adjusted under 35 U.S.C. 154(b) by 11 days.

(21) Appl. No.: 15/747,636

(22) PCT Filed: Jul. 22, 2016

(86) PCT No.: PCT/GB2016/052226
§ 371 (c)(1),
(2) Date: Jan. 25, 2018

(87) PCT Pub. No.: WO2017/021689
PCT Pub. Date: Feb. 9, 2017

(65) Prior Publication Data

US 2018/0211436 A1     Jul. 26, 2018

(30) Foreign Application Priority Data

Jul. 31, 2015   (GB) .................................. 1513609.6

(51) Int. Cl.
*G06T 1/20*     (2006.01)
*G06T 15/00*    (2011.01)
(Continued)

(52) U.S. Cl.
CPC .......... *G06T 15/005* (2013.01); *G06F 9/3826* (2013.01); *G06F 9/3836* (2013.01);
(Continued)

(58) Field of Classification Search
CPC ......... G06T 1/20; G06T 15/005; G06T 15/80; G06F 9/3851; G06F 9/30087;
(Continued)

(56) References Cited

U.S. PATENT DOCUMENTS

| 6,615,338 | B1 | 9/2003 | Tremblay |
| 7,439,979 | B1 | 10/2008 | Allen |
| 7,623,132 | B1 | 11/2009 | Bastos |
| 8,108,610 | B1 * | 1/2012 | Glasco .................... G06F 12/08 711/118 |

(Continued)

FOREIGN PATENT DOCUMENTS

GB     2517047     2/2016

OTHER PUBLICATIONS

PCT International Search Report and Written Opinion dated Sep. 23, 2016, PCT Patent Application No. PCT/GB2016/052226.
(Continued)

*Primary Examiner* — Hau H Nguyen
(74) *Attorney, Agent, or Firm* — Vierra Magen Marcus LLP

(57) ABSTRACT

A programmable execution unit (42) of a graphics processor includes a functional unit (50) that is operable to execute instructions (51). The output of the functional unit (50) can both be written to a register file (46) and fed back directly as an input to the functional unit by means of a feedback circuit (52). Correspondingly, an instruction that is to be executed by the functional unit (50) can select as its inputs either the fed-back output (52) from the execution of the previous instruction, or inputs from the registers (46). A register access descriptor (54) between each instruction in a group of instructions (53) specifies the registers whose values will be available on the register ports that the functional unit will read when executing the instruction, and the register address where the result of the execution of the instruction will be written to. The programmable execution unit (42) executes group of instructions (53) that are to be executed atomically.

19 Claims, 5 Drawing Sheets

(51) Int. Cl.
  *G06T 15/80* (2011.01)
  *G06F 9/38* (2018.01)
(52) U.S. Cl.
  CPC .......... *G06F 9/3851* (2013.01); *G06F 9/3853* (2013.01); *G06F 9/3859* (2013.01); *G06T 1/20* (2013.01); *G06T 15/80* (2013.01); *G06T 2200/28* (2013.01)
(58) Field of Classification Search
  CPC .... G06F 9/3842; G06F 9/3009; G06F 9/3836; G06F 9/3853; G06F 9/3891; G09G 5/363
  See application file for complete search history.

(56) References Cited

U.S. PATENT DOCUMENTS

| | | |
|---|---|---|
| 2006/0112261 A1 | 5/2006 | Yourst |
| 2009/0070568 A1 | 3/2009 | Shi et al. |
| 2014/0176568 A1* | 6/2014 | Bastos ..................... G06T 1/20 345/501 |
| 2015/0100749 A1 | 4/2015 | Koker |

OTHER PUBLICATIONS

GB Combined Search and Examination Report dated Feb. 11, 2016, GB Patent Application No. GB1513609.6.
PCT International Preliminary Report on Patentability dated Feb. 15, 2018, PCT Patent Application No. PCT/GB2016/052226.

* cited by examiner

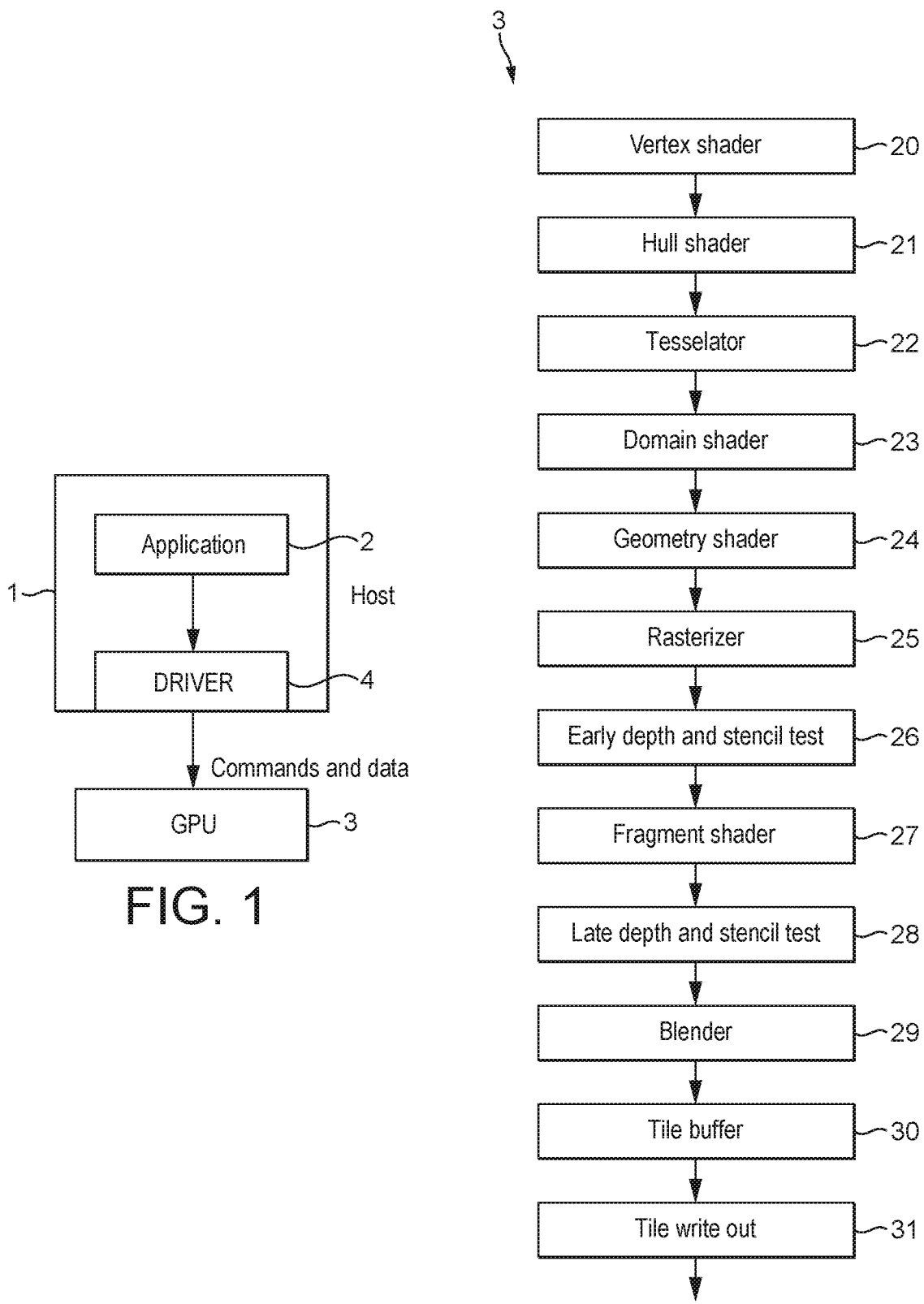

DATA PROCESSING SYSTEMS

BACKGROUND

The technology described herein relates to data processors, such as graphics processors, that include one or more programmable execution units.

Graphics processing is typically carried out in a pipelined fashion, with one or more pipeline stages operating on the data to generate the final render output, e.g. frame that is displayed. Many graphics processing pipelines now include one or more so-called "shading" stages, commonly referred to as "shaders". For example, a graphics processing pipeline may include one or more of, and typically all of, a geometry shader, a vertex shader and a fragment (pixel) shader. These shaders are processing stages that execute shader programs on input data values to generate a desired set of output data (e.g. appropriately shaded and rendered fragment data in the case of a fragment shader) for processing by the rest of the graphics processing pipeline and/or for output.

A graphics "shader" thus performs graphics processing by running small programs for each work item in an output to be generated, such as a render target, e.g. frame (a "work item" in this regard is usually a vertex or a sampling position (e.g. in the case of a fragment shader), but it may also be a compute shader work item where the graphics processing pipeline is being used to perform compute shading operations (e.g. in accordance with OpenCL or DirectCompute)).

In graphics shader operation, each work item will be processed by means of an execution thread which will execute the shader program in question for the work item in question. Modern graphics processing units (graphics processors) accordingly typically comprise one or more programmable execution units that can execute shader programs to perform graphics processing operations. A given shader program to be executed by the programmable execution unit will comprise a sequence of instructions, and the programmable execution unit will execute the instructions in the sequence appropriately for each execution thread (and work item) that the shader program is to be executed for.

The Applicants believe that there remains scope for improved arrangements for the execution of programs, such as shader programs, in programmable execution units of data processing systems, such as in a programmable execution unit of a graphics processing unit of a graphics processing system.

BRIEF DESCRIPTION OF THE DRAWINGS

A number of embodiments of the technology described herein will now be described by way of example only and with reference to the accompanying drawings, in which:

FIG. 1 shows an exemplary computer graphics processing system;

FIG. 2 shows schematically a graphics processing pipeline that can be operated in the manner of the technology described herein;

Like reference numerals are used for like components where appropriate in the drawings.

DETAILED DESCRIPTION

Figure 3:
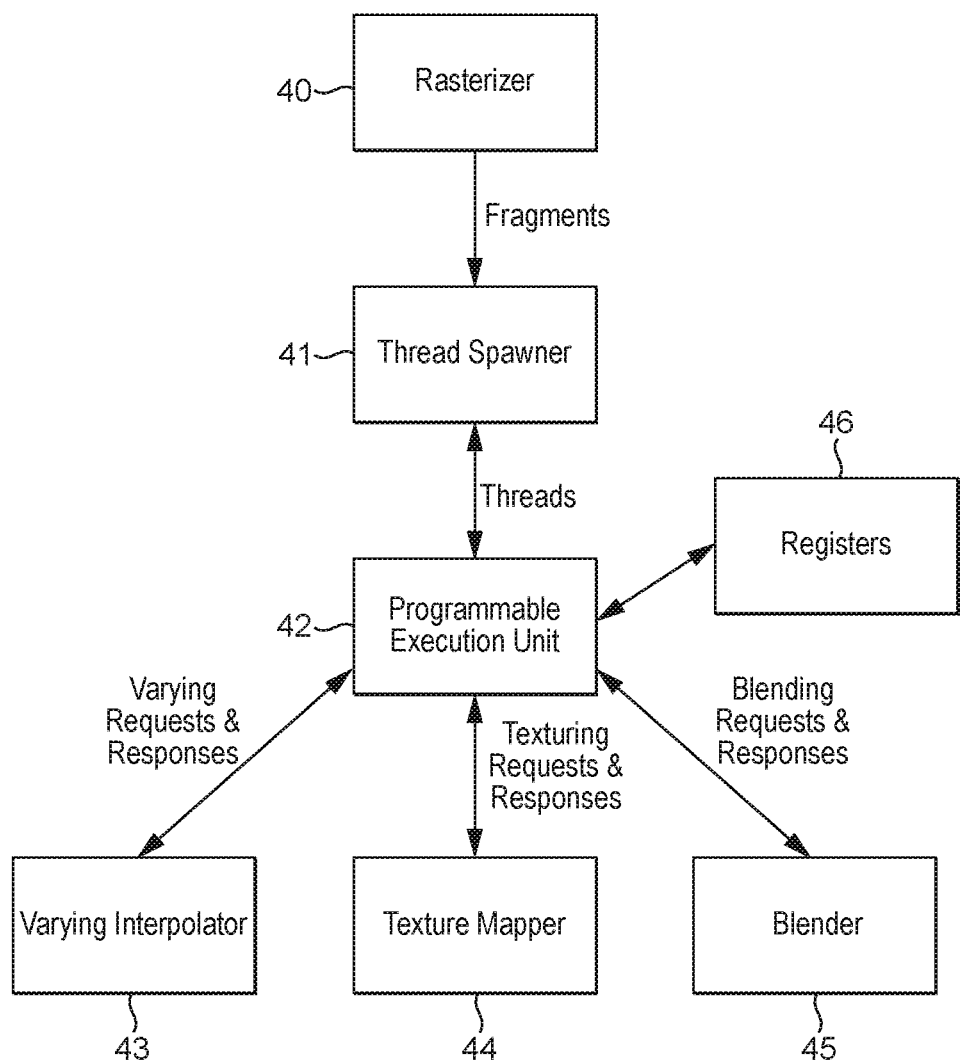
FIG. 3 shows schematically a graphics processing unit.

A first embodiment of the technology described herein comprises a programmable execution unit for a data processing unit, the programmable execution unit comprising:

processing circuitry operable to, when the programmable execution unit is executing a program that comprises a sequence of instructions to be executed by the programmable execution unit:

execute the instructions of a group of instructions of the sequence of instructions of the program atomically; and further comprising:

circuitry configured to pass a result generated by executing an instruction in a group of instructions that is being executed atomically directly for use when executing another instruction in the group of instructions that is being executed atomically.

A second embodiment of the technology described herein comprises a method of operating a programmable execution unit of a data processing unit that executes program instructions to perform data processing operations, the method comprising:

the programmable execution unit when executing a program for an execution thread, the program comprising a sequence of instructions to be executed by the programmable execution unit when executing the program:

executing at least one group of instructions of the sequence of instructions for the program atomically; and passing a result generated by executing an instruction in the group of instructions that is being executed atomically directly for use by another instruction in the group of instructions that is being executed atomically.

The technology described herein relates to the execution of programs in programmable execution units of data processing units, such as of a graphics processing unit (graphics processor, GPU).

In the technology described herein, groups of instructions of a program to be executed can be (and are) executed by the programmable execution unit atomically (i.e. such that once execution of the group of instructions has been started, that execution runs to completion with rigid timing and is not and cannot be interrupted in the middle). (If a sequence of operations is carried out atomically, the sequence of operations is carried out so that to every observer, it looks as if the sequence has either not been performed at all, or been performed in its entirety, i.e. it is executed as one indivisible unit, hence the name "atomic".)

Executing a group of instructions atomically has the effect that no instruction scheduling decisions need to be taken during execution of that group of instructions. This helps to reduce power and resources that may be spent on instruction scheduling. Thus, respective groups of instructions within a program to be executed can be, and are in an embodiment, treated as one unit for instruction scheduling purposes, thereby reducing the instruction scheduling overhead.

Furthermore, in the technology described herein results generated by one instruction in a group of instructions that is being executed atomically can be passed directly for use by another instruction in the group of instructions that is being executed atomically. This is possible because the group of instructions is being executed atomically, and so it can effectively be guaranteed that the instruction that is to use the results that are provided in this way will be ready to execute and use the results when the results are provided (such there is then no need to be able to store the results in such a way that they would be available for and at an indeterminable time in the future). This then avoids the need, e.g., to write those results out to the (main) register file of the data processing unit, thereby further reducing the use of resources and saving power when executing the program.

The technology described herein can be implemented in any suitable and desired data processing system and unit that has one or more programmable execution units. Thus it could, for example, be used in an execution unit of a CPU (Central Processing Unit), if desired.

As discussed above, it is believed that the technology described herein will have particular application in graphics processing systems. Thus the data processing system in an embodiment comprises a graphics processing system and the data processing unit in an embodiment comprises a graphics processing unit (GPU). Correspondingly the programmable execution unit in an embodiment operates as a programmable graphics shading stage (shader) which executes graphics shader programs to perform graphics processing operations.

The program should (and in an embodiment does) produce some useful output data, e.g. graphics processing output data for use in (subsequent) graphics processing operations, such as (an array of) vertex data, (an array of) fragment data etc. Thus, in an embodiment, the programmable execution unit executes a program so as to generate (an array of) graphics processing output data.

The generated output data may be further processed (in an embodiment for display), e.g. by a graphics processing pipeline, and/or provided to a display for display. Thus, in an embodiment, the generated output data is further processed, e.g. for display. In an embodiment, the generated output data is used to provide an image for display, e.g. is provided to a display for display.

There may be one or plural programmable execution units in the data processing unit. Where there are plural programmable execution units, then each programmable execution unit is in an embodiment operable in the manner of, and configured to operate in the manner of, the technology described herein.

The (and each) programmable execution unit may comprise any suitable and desired programmable hardware element, such as programmable processing circuitry. Where there are plural programmable execution units, each programmable execution unit may be provided as a separate circuit element to other programmable execution units of the data processing units, or the programmable execution units may share some or all of their programmable processing circuitry.

In an embodiment the (and each) programmable execution unit comprises one or more functional units that execute the program instructions. In one embodiment, the (and in an embodiment each) execution unit has a single functional unit (and thus will execute one instruction in any given clock cycle). In other embodiments, the programmable execution unit includes plural functional units, such as, and in an embodiment, two functional units. In this case, the execution unit may execute plural instructions in a given clock cycle (with one instruction being executed by each functional unit of the execution unit).

The execution unit can execute any desired and suitable program that is to be executed by the data processing unit. Thus in the case of a graphics processing unit, the execution unit can execute any suitable and desired shader program, such as a vertex shader, a fragment shader or a compute shader (e.g. in accordance with OpenCL). Correspondingly, the programmable execution unit is in an embodiment operable as any desired shader stage of a graphics processing pipeline and that a graphics processing pipeline can operate as, such as a vertex shader, a fragment shader or a compute shader (by it being appropriately programmed to serve as the desired programmable execution stage).

The programmable execution unit will receive execution threads to be executed, and execute appropriate programs for those threads to generate the desired output.

The technology described herein can be used for any program that is to be executed by the programmable execution unit. In the case of a graphics processing system and unit, the program that is being executed is in an embodiment an appropriate shader program, such as a vertex shader, fragment shader or compute shader.

The program to be executed will, and in an embodiment does, comprise a sequence of instructions to be executed by the programmable execution unit.

The sequence of instructions for the program to be executed by the programmable execution unit can be divided into respective groups of instructions to be executed atomically in any suitable and desired manner. The program may be divided into one or plural groups of instructions, as desired. For example, a program may be executed as a single group of instructions comprising all the instructions for the program that is executed atomically. This may be appropriate where it would be possible to execute the entire program atomically.

However, in an embodiment, the program (the sequence of instructions for the program) is divided into plural (smaller) groups of instructions for execution purposes (i.e. the program will be executed as plural (different) groups of instructions).

Each group of instructions that a program is divided into for the purposes of the technology described herein should, and in an embodiment does, comprise a contiguous sequence of instructions to be executed for the program.

Each group of instructions may contain any suitable and desired number of instructions (e.g., and in an embodiment, that are able to be executed atomically). In an embodiment, each group of instructions comprises 2 to 8 instructions.

While it would be possible to only execute some but not all of the groups of instructions that a program has been divided into atomically in the manner of the technology described herein, in an embodiment where a program to be executed is divided into plural groups of instructions for execution purposes, then in an embodiment plural, and in an embodiment all (each), of the groups of instructions are respectively executed atomically.

Where the execution unit is able to execute more than one instruction in a given execution cycle (e.g. because it contains plural functional units, each operable to execute a respective instruction in a given execution cycle), then each group of instructions to be executed may contain, and in an embodiment does contain, respective sets of instructions that are to be executed in turn, with each such set of instructions being a set of instructions that can and will run together in the same execution cycle and take (exactly) one execution cycle to execute. Thus, for example, where the programmable execution unit includes two functional units, each operable to execute a respective instruction, then in an embodiment each group of instructions comprises plural instruction tuples, with each instruction tuple comprising a pair of instructions, one for each functional unit, that will be executed together in the same execution cycle (one by each functional unit), and that will take exactly one execution cycle to execute.

Thus in an embodiment, each group of instructions that is to be executed atomically comprises one or more sets of instructions, with each such set of instructions being a set of plural instructions that will be executed together in the same execution cycle by the programmable execution unit (and that will take one execution cycle to execute).

Where a program to be executed includes instructions, such as memory loads, that have non-deterministic latencies (i.e. for which the timing of the completion of those instructions cannot be determined in advance or guaranteed), then in an embodiment, at most only one such instruction is included in a given group of instructions that is to be executed atomically. In an embodiment, the instruction groups are also arranged such that where an instruction group includes such an instruction, no other instructions in the group in question depend on the result to be produced by that "non-deterministic" instruction.

Correspondingly, in an embodiment, any dependencies related to such "non-deterministic" instructions are checked only between (the execution of) instruction groups that are to be executed atomically, not during the (atomic) execution of an instruction group.

The atomic execution of a group of instructions can be achieved in any suitable and desired manner. For example, and in an embodiment, a subsystem is provided to fetch and issue the instructions of each instruction group. Furthermore, in an embodiment the whole instruction group is available from a store that can, e.g., deliver the instructions with fixed timing throughout the execution of the instruction group. This could be achieved, for example, by having an instruction cache where each instruction group is wholly contained within a cache line. The cache line may then be locked during the execution of the instruction group.

In an embodiment, when an execution thread reaches the beginning of a group of instructions that is to be executed atomically, the execution of that thread is stalled until any dependencies for the group of instructions (such data values from other instructions that may be required when executing the group of instructions) have been met. Correspondingly, the execution of the thread is in an embodiment also stalled until all the data values that will be required for executing the group of instructions are available. Then, once any dependencies for the group of instructions have been met and/or any relevant data values are available, the thread is released to execute the group of instructions, and that execution is performed in an atomic manner (i.e. the thread executes all of the instructions in the group of instructions in turn, without interruption (without stalling or pausing) and with rigid (fixed) execution timing).

In an embodiment any dependencies, etc., for a group of instructions to be executed atomically are indicated for the group of instructions, e.g., and in an embodiment, in a header for (that is associated with) the group of instructions.

As discussed above, the result(s) of the execution of one instruction in a group of instructions that is being executed atomically can be provided directly to another instruction of the group of instructions that is being executed atomically. This arrangement should be, and is in an embodiment, such that the result(s) can be provided from one instruction to another instruction within a group of instructions being executed atomically without the first instruction's result having to be (and being) written to any registers of the register file for the programmable execution unit.

The Applicants have recognised in this regard that in many programs, the operations that are being performed by the instructions in the program tend to be sequential, such that in many cases, the instruction that needs the results of a given instruction is the next instruction to be executed. This then means that opportunities to pass results directly from one instruction to another (e.g. to the next instruction) will tend to arise relatively frequently in programs to be executed.

Furthermore, because the instructions are being executed atomically, it can be guaranteed that the later instruction will be ready to use the result of the previous instruction when it is provided.

Where the result(s) of one instruction are to be passed directly to another instruction within a group of instructions that is being executed atomically, then the result(s) can be passed directly to any other (later) instruction in the group of instructions, but are in an embodiment passed (for use) to the next instruction in the group of instructions. In an embodiment the result from each instruction is passed directly so as to be available to the next instruction in the group.

The result(s) of an instruction can be passed directly to another instruction for use in any suitable and desired manner. In an embodiment, the programmable execution unit comprises a "bypass" network (bypass circuitry) that is operable to provide the results (the output) from the execution of one instruction for use as an input when another instruction is being executed by the execution unit (without the need to add the result(s) from the instruction to the register file for the execution unit).

In an embodiment, the programmable execution unit includes a feedback circuit that is operable to feedback the results (the output) from the execution of one instruction for use as an input to the execution unit when another instruction (e.g., and in an embodiment, the next instruction) is being executed.

In an embodiment, the feedback circuit is operable to feedback the output from a functional unit of the execution unit to the input of the functional unit, so that the output when the functional unit executes one instruction is then provided as an available input to the functional unit when it is executing a later (and in an embodiment the next) instruction.

Thus, the programmable execution unit in an embodiment includes a feedback circuit that is operable to (configured to) feedback the output from the execution of one instruction so as to be selectable as an input when executing another instruction (e.g., and in an embodiment, the next instruction).

In an embodiment, the programmable execution unit is configured such that the result from executing an instruction is always passed directly (fed back) to the input of the execution unit (e.g. of a functional unit) so as to be available for use when executing another instruction (in the group of instructions), and then instructions that are being executed can select that fed back output from the execution of a previous instruction as an input (as an operand) for their execution. Correspondingly, the programmable execution unit in an embodiment comprises circuitry operable to allow an instruction to select as an input (as an operand) when executing the instruction the output of a previous instruction that has been fed back from the output of the execution (e.g. functional) unit.

This then allows the result from the execution of one instruction to be passed directly for use when executing another instruction in the sequence of instructions (without, e.g., the need to add the output (the results) from the instruction to the register file for the execution unit).

Where the programmable execution unit includes plural functional units, then in an embodiment the output from one (and in an embodiment from plural, and in an embodiment from each) functional unit is fed back to the input of plural of and in an embodiment of each of the plural functional units, so that that output is available as an input to plural of, and in an embodiment to each of the, functional units when they are executing a later (and in an embodiment their next) instruction.

In an embodiment, as well as being able to pass the results of executing an instruction directly from one instruction to another within a group of instructions that is executing atomically, it is also possible for the results of instructions to be written to respective registers, e.g. in the case where they are needed to be stored for longer periods of time (e.g. are needed for use by another instruction or instructions which is not the next instruction in the program sequence and/or that is in a different group of instructions in the program sequence).

This will then allow those instruction results to be retained for a longer period of time than simply being passed directly to another instruction for use.

Indeed, it may not be the case that for every group of instructions that is executed atomically, the result from one instruction is used directly when executing another instruction, as that will depend upon the nature of the instructions that are being executed. Thus there may be situations where, for a given group of instructions that is being executed atomically, in practice none of the results of the processing of those instructions are used directly when executing another instruction in the group of instructions, but rather all the results are stored in registers.

Thus, in an embodiment the programmable execution unit is configured such that the result of executing an instruction can be, in an embodiment selectively, written to a register or registers for storage.

In an embodiment, the programmable execution unit is operable to be able to both provide the result of executing an instruction directly for use as an input when executing another instruction in the group of instructions, and to be able to write the results of an instruction to a register, for example for use by later instructions.

In an embodiment the programmable execution unit is configured such that the result of executing an instruction is always passed directly (fed back) to the input of the execution unit so as to be available for use as an input when executing another instruction in the group of instructions, and the result of the instruction can also selectively be written to a register or registers for storage.

In an embodiment, as well as an instruction that is being executed being able to use (select) as an input the result of a previously executed instruction that has been fed back (passed directly for use by the instruction), an instruction to be executed can also use (and in an embodiment select) as an input at least one, and in an embodiment plural, values that are stored in the register file (in registers) of or accessible to the programmable execution unit.

These registers may be, and are in an embodiment, used to store data, such as constants, uniforms and results from previous execution cycles or instruction groups, that may be required for the instruction or instruction group that is being executed.

Thus, in an embodiment, the programmable execution unit includes circuitry operable to allow an instruction to be executed to select as an input (as an operand) when executing the instruction data that is stored in a register in the register file of or accessible to the programmable execution unit. In an embodiment, the programmable execution unit comprises circuitry operable to allow an instruction to select as an input (as an operand) when executing the instruction from the output of a previous instruction that has been fed back from the output of the execution (e.g. functional) unit and at least one data value that is stored in a register of the register file.

Correspondingly, there is in an embodiment a register file associated with the programmable execution unit, that the programmable execution unit can access. In an embodiment the register file includes one or more register ports, and the programmable execution (e.g. a functional) unit can use values provided on the register ports as inputs when executing instructions.

Thus, in an embodiment, the programmable execution unit (and in an embodiment the relevant functional unit of the execution unit that is to execute the instructions) is connected to an appropriate register port or ports of the register file to allow it to receive data stored in registers for inputs. There is in an embodiment then appropriate selection circuitry, such as a multiplexer, that is operable to select, e.g., which of the register ports to read as an input when executing an instruction (and/or whether to read the output result from a previous instruction that is fed back directly to be available as an input when executing an instruction).

In an embodiment the data values from plural registers can be provided and selected as inputs when an instruction is being executed.

However, the Applicants have recognised that by allowing the results from the execution of one instruction to be passed (fed back) directly as an input for another instruction, that can reduce the number of input data values that it may be necessary to allow instructions to be able to read from registers, thereby reducing the number of registers that the instructions may need to access during their execution.

Thus, in an embodiment, the instructions are only able to access (take inputs from) a more limited number of registers, i.e. they can in an embodiment only select between a more limited number of register ports. Thus in an embodiment, the instructions can access (and the execution unit only has connections to) one or at most two register ports (i.e. can only select from up to two register values for their inputs).

Thus a further advantage of the technology described herein is that it can reduce the number of register ports that may need to be provided in the register file for use by the programmable execution unit.

Furthermore, by having the instructions when executing access only a more limited set of registers, that allows the register access system when executing the instructions to be simplified. For example, the address encoding that may be required for the instructions can be reduced.

Thus, in an embodiment, the instructions being executed are able to (and only able to) access (and address into) a smaller set of registers (instead of addressing directly into the entire main register file).

In other words, rather than the instructions that are being executed being able to access the full register file address space, they in an embodiment access a smaller, local address space.

Thus, in an embodiment the instructions to be executed use an address encoding to indicate their inputs (operands) that can only indicate a more limited set of input sources (a more limited address space), such as, for example, 2-bit address encoding (which would then allow four different input sources, for example, to be indicated).

In an embodiment, the address encoding that is used for the instructions can indicate whether the instruction is to use a register value or a result fed back directly from another instruction as its inputs (operands). For example, where the instructions use a 2-bit address encoding, two of the four values that the 2-bit address encoding can indicate could indicate respective register values (e.g., and in an embodiment, which of two register ports to read), and the other two values could indicate respective results fed back directly from the execution of previous instruction(s).

In an embodiment, there is a local "pool" of storage that the instructions can address into (can use) to indicate where their inputs (operands) should be loaded from. This addressable local storage pool in an embodiment comprises a limited set of register reads and any results that are fed back directly from previously executed instructions.

Where instructions to be executed simply, in effect, address a register port of the register file, then the relevant data values will need to be provided at the port in question when the instruction falls to be executed. This can be achieved in any suitable and desired manner, but in an embodiment, register access descriptors are included with the program to be executed that indicate the relevant register values that should be provided on the register ports that can be accessed as inputs when executing an instruction. In an embodiment, these register access descriptors indicate the register whose value is to be provided on the port in question. In an embodiment the register access descriptor indicates the address of the register whose value is to be provided. (Thus, where there are two register ports, in an embodiment the register access descriptor indicates two register addresses, indicating the registers where the respective values for each respective register port should be provided from.)

In an embodiment, the register access descriptor can, and in an embodiment does, also indicate which register the output value from executing an instruction should be written to. Again, this is in an embodiment given as a write address indicating the address of the register in question. This will then allow the output of the programmable execution unit (e.g. of a respective functional unit) to be simply provided directly to a or the write port of the register file, with the address in the register access descriptor then being used to map that value provided to the write port to the appropriate register for storage.

Thus, in an embodiment, the main register file accesses that are required for execution of an instruction are not encoded in the instructions themselves, but are instead indicated (and encoded) separately to the instructions, in an embodiment in register access descriptors that are included with the instructions.

The register accesses and the register access descriptors can be scheduled in any appropriate and desired manner in relation to the instruction execution. For example, the register accesses could be performed between each respective group of instructions that is to be executed atomically, or a register access could be performed between each respective instruction in the sequence of instructions that is to be executed. This may depend, for example, upon whether each instruction to be executed requires a different set of input values and/or is to write its output value to a different register, or not, and/or the number of different register ports the execution unit has access to.

In an embodiment the register file accesses to provide data as inputs are scheduled and performed before (in an embodiment immediately before) the execution of the instruction that they relate to, and correspondingly, any register file access to write a result from the execution of an instruction to the register file is scheduled to be performed after (and in an embodiment immediately after) execution of the relevant instruction has been completed.

In an embodiment, a given register access descriptor is operable to set the register reads such that the appropriate register values will be provided on the register ports for the next instruction or instructions to be executed after that register access, and, correspondingly, to set the register that the output (result) of that instruction or instructions will be written to. Thus, the register-writes for one instruction in an instruction group may typically happen at the same time as the register-reads for the next instruction in the group. As such, they may be encoded together. Alternatively, the register-reads and register-writes for one instruction may be encoded together. Thus, in either case, and in an embodiment, appropriate register access descriptors are inserted in the sequence of instructions for the program at appropriate points in the sequence of instructions so as to set the register accesses appropriately for the instructions.

Thus, for example, where it is only necessary to set the register access schedule between each group of instructions to be executed atomically, then an appropriate register access descriptor that sets the registers to be read and to be written for the next group of instructions to be executed can be included before the group of instructions.

In an embodiment, a register access descriptor is included before each instruction (i.e. between each successive pair of instructions) so as to set the register reads and any necessary register writes for that next instruction.

Thus, in an embodiment, the register file accesses are scheduled and performed between the execution of respective instructions. Correspondingly a register access descriptor is in an embodiment included before each instruction to be executed.

Configuring the register accesses in this way avoids, for example, any need for the hardware to examine the instructions themselves in order to determine how many registers they need and how their register reads should map to the underlying file structure and to have to make any scheduling decisions relating to register file accesses for instruction execution.

The organisation of a given program to be executed into groups of instructions that are executed atomically in the technology described herein can be performed by any suitable and desired element or component of the overall data processing system. For example, the execution hardware could itself be operable to take program instructions that it is provided with and execute appropriate groups of those instructions atomically.

In one embodiment, the compiler for the program (for the programmable execution unit) is operable to arrange a program that is to be executed into respective groups of instructions that are to be executed atomically (and to indicate appropriately those groups of instructions to the execution unit). Thus, in the case of a graphics processing system, the shader compiler for the graphics processing unit in an embodiment performs this operation.

Thus, in an embodiment, the compiler for the programmable execution unit in an embodiment analyses a program that it receives for compiling and organise the instructions for the program into respective groups that can be executed atomically, including, for example, and in an embodiment, identifying any instructions that have non-deterministic latencies (and then ensuring that only one such instruction is included in any given group of instructions that is to be executed atomically).

The compiler in an embodiment will also provide any appropriate descriptors (headers) indicating any dependencies that must be met before a given group of instructions to be executed atomically can be executed.

In an embodiment, the compiler also includes appropriate register access descriptors in the sequence of compiled instructions, e.g. between or before respective groups of instructions to be executed atomically and/or between or before respective instructions in the compiled program.

The compiled program (program binary) (and any descriptors, headers, etc.) will then be provided appropriately to the programmable execution unit for execution.

The compiler could, for example, indicate groups of instructions by packaging them into a data structure containing a header in addition to the actual instructions themselves. The header could then contain information about, e.g., how long the instruction group is and which data dependencies it has.

The header may additionally contain extra information such as any or all of:
- an indication of whether there are non-deterministic-latency instructions in the instruction group, and, if there are any, parameters to control its execution;
- floating-point operation flags that are likely to be the same for many consecutive instructions, such as rounding-mode, exception-mode,
flush-to-zero mode etc.;
- instruction flow control indicators (e.g. branch divergence/reconvergence, end-of-program, back.to-back execution enable etc.);
- instruction type indicator (e.g. an indicator to distinguish between 32-bit and 64-bit operation, with each instruction-group being restricted to do either one or the other);
- The specifics of such extra information may be implementation-specific, and may differ from one embodiment to another.

In an embodiment, for fixed-latency instructions, register access scheduling is performed by the compiler. This helps to enable the rigid-timing flow, as register-file access scheduling may create a greater burden than instruction scheduling.

For nondeterministic latency instructions (e.g. memory load), in an embodiment some scheduling hardware is employed. However, this may make up only a small portion of the total register-file activity, and as such, the scheduling hardware may be simplified without undue performance loss.

The compiler may, e.g., and in an embodiment does, run on a host processor of the data processing system that includes the data processing unit that includes the programmable execution stage (with the programmable execution unit then being on another processor, such as a graphics processor that is associated with the host processor (such that the compiler and compiled code all run on separate processors within the overall data processing system, e.g. graphics processing system)). However, other arrangements would be possible, such as a compiler running on the same processor as the compiled code, or the compiler being run on a separate processor, such as the program being pre-compiled on a separate system and being distributed in a compiled form.

The technology described herein accordingly extends to the overall operation of the data processing system and the data processing unit, including the provision of the program to be executed to the execution unit and then the execution of that program in the manner of the technology described herein.

Thus, another embodiment of the technology described herein comprises a method of operating an execution pipeline of a data processing system, which execution pipeline includes a programmable execution unit that executes program instructions to perform data processing operations, the method comprising: issuing to the programmable execution unit a program to be executed by the programmable execution unit, the program comprising a sequence of instructions to be executed by the programmable execution unit when executing the program;

issuing one or more execution threads for which the program is to be executed to the programmable execution unit for execution; and executing the program for the execution thread or threads;

wherein:

executing the program for the execution thread or threads comprises:

executing at least one group of instructions of the sequence of instructions for the program atomically; and passing a result generated by an instruction in the group of instructions that is being executed atomically directly for use by another instruction in the group of instructions that is being executed atomically.

Another embodiment of the technology described herein comprises a data processing system, comprising:

an execution pipeline, the execution pipeline comprising a programmable execution unit that executes program instructions to perform data processing operations;

wherein:

the data processing system is configured to:

issue to the programmable execution unit of the execution pipeline a program to be executed by the programmable execution unit that comprises a sequence of instructions to be executed by the programmable execution unit when executing the program; and the execution pipeline is configured to:

issue one or more execution threads to the programmable execution unit for which the program is to be executed for execution; and the programmable execution unit of the execution pipeline comprises:

processing circuitry operable to, when the programmable execution unit is executing a program that comprises a sequence of instructions to be executed by the programmable execution unit:

execute the instructions of a group of instructions of the sequence of instructions of the program atomically; and circuitry configured to pass a result generated by executing an instruction in a group of instructions that is being executed atomically directly for use when executing another instruction in the group of instructions that is being executed atomically.

As will be appreciated by those skilled in the art these embodiments of the technology described herein can, and in an embodiment do, include, as appropriate, any one or more or all of the features described herein.

In an embodiment processing circuitry of the data processing system, such as driver processing circuitry (a driver), issues the program to the programmable execution unit. In an embodiment, processing circuitry of the execution pipeline, in an embodiment, execution thread issuing circuitry, such as thread spawning circuitry and/or scheduling circuitry (a thread spawner and/or scheduler) issues the execution threads to the programmable execution unit.

The operation in the manner of the technology described herein could be done for some but not all, e.g. for selected, programs to be executed by the programmable execution unit, but is in an embodiment done for each and every program that is to be executed by the programmable execution unit.

As will be appreciated by those skilled in the art, the data processing, e.g. graphics processing, unit of the technology described herein may be part of an overall data processing system that will include, e.g., and in an embodiment, a host processor that, e.g., executes applications that require processing by the data processing unit. The host processor will send appropriate commands and data to the data processing unit to control it to perform data processing operations and to produce data processing output required by applications executing on the host processor. To facilitate this, the host processor should, and in an embodiment does, also execute a driver for the data, e.g. graphics, processing unit and a compiler or compilers for compiling programs to be executed by the programmable execution unit of the data processing unit.

The data, e.g. graphics, processing unit may also comprise, and/or be in communication with, one or more memories and/or memory devices that store the data described herein, and/or the output data generated by the data processing unit, and/or store software for performing the processes described herein. The data processing unit may also be in communication with a host microprocessor, and/or with a display for displaying images based on the data generated by the data processing unit.

Where the data processing unit is a graphics processing unit, then as well as any programmable processing (shader) stages, such as a vertex shader and fragment shader, the graphics processing unit and pipeline may also contain any other suitable and desired processing stages that a graphics processing pipeline may contain such as a rasteriser, an early depth (or an early depth and stencil) tester, a late depth (or depth and stencil) tester, a blender, a tile buffer, a write out unit, etc.

The technology described herein can be used for all forms of output that a data processing unit may output. Thus, in the case of a graphics processing pipeline, it may be used when generating frames for display, render-to-texture outputs, etc. The output data values from the data processing are in an embodiment exported to external, e.g. main, memory, for storage and use.

Where the data processing unit is a graphics processing unit, the technology described herein is applicable to any suitable form or configuration of graphics processing unit. It is particularly applicable to tile-based graphics processors and graphics processing systems. Thus in an embodiment, the graphics processing system and graphics processing unit are a tile-based system and pipeline, respectively.

In an embodiment, the various functions of the technology described herein are carried out on a single graphics processing platform that generates and outputs the rendered fragment data that is, e.g., written to the frame buffer for the display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may be provided as a separate circuit element to any one or more of the other processing stages or processing stage circuitry, and/or any one or more or all of the processing stages and processing stage circuitry may be at least partially formed of shared processing circuitry.

Subject to any hardware necessary to carry out the specific functions discussed above, the data processing system and pipeline can otherwise include any one or more or all of the usual functional units, etc., that data processing pipelines include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

A number of embodiments of the technology described herein will now be described in the context of the processing of computer graphics for display.

FIG. 1 shows a typical computer graphics processing system.

An application 2, such as a game, executing on a host processor 1 will require graphics processing operations to be performed by an associated graphics processing unit (graphics processing pipeline) 3. To do this, the application will generate API (Application Programming Interface) calls that are interpreted by a driver 4 for the graphics process pipeline 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

FIG. 2 shows the graphics processing pipeline 3 of the present embodiment in more detail.

The graphics processing pipeline 3 shown in FIG. 2 is a tile-based renderer and will thus produce tiles of a render output data array, such as an output frame to be generated.

(In tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.)

The render output data array may typically be an output frame intended for display on a display device, such as a screen or printer, but may also, for example, comprise intermediate data intended for use in later rendering passes (also known as a "render to texture" output), etc.

(When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.)

FIG. 2 shows the main elements and pipeline stages of the graphics processing pipeline 3 that are relevant to the operation of the present embodiment. As will be appreciated by those skilled in the art there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may be implemented as desired and will accordingly comprise, e.g., appropriate circuitry and/or processing logic, etc., for performing the necessary operation and functions.

As shown in FIG. 2, the graphics processing pipeline 3 includes a number of stages, including vertex shader 20, a hull shader 21, a tesselator 22, a domain shader 23, a geometry shader 24, a rasterisation stage 25, an early Z (depth) and stencil test stage 26, a renderer in the form of a fragment shading stage 27, a late Z (depth) and stencil test stage 28, a blending stage 29, a tile buffer 30 and a downsampling and writeout (multisample resolve) stage 31.

The vertex shader 20 takes the input data values associated with the vertices, etc., defined for the output to be generated, and processes those data values to generate a set of corresponding "vertex shaded" output data values for use by subsequent stages of the graphics processing pipeline 3. The vertex shading, for example, modifies the input data to take account of the effect of lighting in the image to be rendered.

The hull shader 21 performs operations on sets of patch control points and generates additional data known as patch constants, the tessellation stage 22 subdivides geometry to create higher-order representations of the hull, the domain shader 23 performs operations on vertices output by the tessellation stage (similar to a vertex shader), and the geometry shader 24 processes entire primitives such as a triangles, points or lines. These stages together with the vertex shader 21 effectively perform all the necessary fragment frontend operations, such as transformation and lighting operations, and primitive setup, to setup the primitives to be rendered, in response to commands and vertex data provided to the graphics processing pipeline 3.

The rasterisation stage 25 of the graphics processing pipeline 3 operates to rasterise the primitives making up the render output (e.g. the image to be displayed) into individual graphics fragments for processing. To do this, the rasteriser 25 receives graphics primitives for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 26 performs a Z (depth) test on fragments it receives from the rasteriser 25, to see if any fragments can be discarded (culled) at this stage. To do this, it compares the depth values of (associated with) fragments issuing from the rasteriser 25 with the depth values of fragments that have already been rendered (these depth values are stored in a depth (Z) buffer that is part of the tile buffer 30) to determine whether the new fragments will be occluded by fragments that have already been rendered (or not). At the same time, an early stencil test is carried out.

Fragments that pass the fragment early Z and stencil test stage 26 are then sent to the fragment shading stage 27. The fragment shading stage 27 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 27 is in the form of a shader pipeline (a programmable fragment shader).

There is then a "late" fragment Z and stencil test stage 28, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 30 to determine whether the fragment data for the new fragments should replace the fragment data of the fragments that have already been rendered, by comparing the depth values of (associated with) fragments issuing from the fragment shading stage 27 with the depth values of fragments that have already been rendered (as stored in the depth buffer). This late fragment depth and stencil test stage 28 also carries out any necessary "late" alpha and/or stencil tests on the fragments.

The fragments that pass the late fragment test stage 28 are then subjected to, if required, any necessary blending operations with fragments already stored in the tile buffer 30 in the blender 29. Any other remaining operations necessary on the fragments, such as dither, etc. (not shown) are also carried out at this stage.

Finally, the (blended) output fragment data (values) are written to the tile buffer 30 from where they can, for example, be output to a frame buffer for display. The depth value for an output fragment is also written appropriately to a Z-buffer within the tile buffer 30. (The tile buffer stores colour and depth buffers that store an appropriate colour, etc., or Z-value, respectively, for each sampling point that the buffers represent (in essence for each sampling point of a tile that is being processed).) These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

The tile buffer is provided as part of RAM that is located on (local to) the graphics processing pipeline (chip).

The data from the tile buffer 30 is input to a downsampling (multisample resolve) write out unit 31, and thence output (written back) to an external memory output buffer, such as a frame buffer of a display device (not shown). (The display device could comprise, e.g., a display comprising an array of pixels, such as a computer monitor or a printer.)

The downsampling and writeout unit 31 downsamples the fragment data stored in the tile buffer 30 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 3 would, of course, be possible.

The above describes certain features of the operation of the graphics processing system shown in FIG. 1. Further features of the operation of the graphics processing system shown in FIG. 1 in accordance with embodiments of the technology described herein will now be described.

As can be seen from FIG. 2, the graphics processing pipeline 3 includes a number of programmable processing or "shader" stages, namely the vertex shader 20, hull shader 21, domain shader 23, geometry shader 24, and the fragment shader 27. These programmable shader stages execute respective shader programs that have one or more input variables and generate sets of output variables and that are provided by the application.

To do this, the application 2 provides the shader programs implemented using a high-level shader programming language, such as GLSL, HLSL, OpenCL, etc. These shader programs are then translated by a shader language compiler to binary code for the target graphics processing pipeline 3. This may include the creation of one or more intermediate representations of the program within the compiler. (The compiler may, e.g., be part of the driver 4, with there being a special API call to cause the compiler to run. The compiler execution can thus be seen as being part of the draw call preparation done by the driver in response to API calls generated by an application. The driver will then issue the compiled program(s) to the graphics processing pipeline 3 for execution by the programmable processing stage(s) of the graphics processing pipeline.)

FIG. 2 shows schematically the operation stages of the graphics processing unit 3.

FIG. 3 shows the corresponding units of the graphics processing unit 3 that are used to perform (and thus to act as) various ones of the processing operations and stages of the graphics processing pipeline shown in FIG. 2. (There may be other units in the graphics processing unit 3. FIG. 3 shows those units that are relevant to operation in the manner of the technology described herein only for simplicity.)

As shown in FIG. 3, the graphics processing unit 3 includes a rasteriser 40, a thread spawner 41, a programmable execution unit 42, a varying interpolator 43, a texture mapper 44, a blender 45, and a set of registers 46.

The thread spawner 41 is operable to spawn execution threads for execution by the programmable execution unit 42, e.g. for fragments that it receives from the rasteriser 40. It may include execution thread issuing circuitry, such as a scheduler (scheduling circuitry), for issuing and to control the issue of threads for execution by the programmable execution unit.

The programmable execution unit 42 operates to execute shader programs to perform the shader operations of the graphics processing pipeline, such as the hull shader, the vertex shader and the fragment shader. To do this, it receives execution threads from the thread spawner 41 and executes the relevant shader program for those execution threads. As part of this operation, and as shown in FIG. 3, the execution threads will read data from and write data to respective registers of the register file 46 of the graphics processing unit.

As part of this processing, and as shown in FIG. 3, the programmable execution unit 42 can call upon the varying interpolator 43, the texture mapper 44 and the blender 45 to perform specific graphics processing operations. To do this, the programmable execution unit will send appropriate messages to the relevant accelerator (and receive the appropriate response therefrom), e.g. in response to specific instructions in a shader program that it is executing.

The varying interpolator 43 operates to interpolate values across graphics primitives, and, as part of this operation, often creates texture coordinates to be used for sampling graphics textures.

The texture mapper 44 operates to sample graphics textures using texture coordinates, e.g. generated by the varying interpolator 43, and produces therefrom a filtered texture sample result (which it can then return to the programmable execution unit 42 for use, e.g. when shading sampling points).

The blender 45 operates to blend, e.g., fragment shading results generated by the programmable execution unit 42 with previously generated fragment shader results, such as results that are already stored in the tile buffer and/or the frame buffer.

In the present embodiment, and in accordance with the technology described herein, the programmable execution unit 42 of the graphics processing unit 3 is operable to be able to execute groups of instructions of a shader program that it is executing atomically, and also to pass the result of executing one instruction directly as an input for use when executing another instruction.

Figure 4:
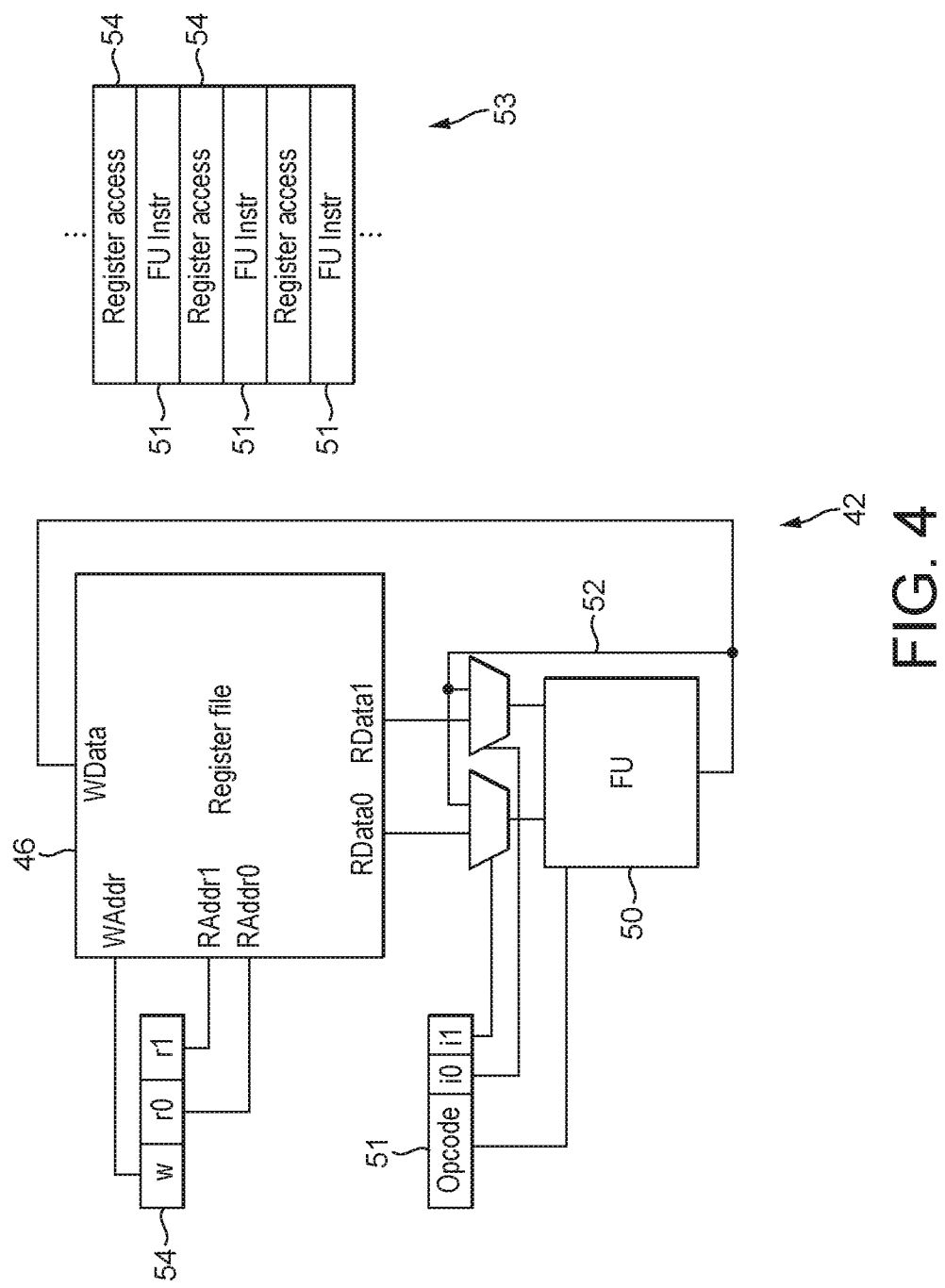
FIG. 4 shows schematically a first embodiment of the programmable execution unit of the graphics processing unit of FIG. 3.

FIG. 4 shows schematically a first embodiment of the programmable execution unit that is operable in this manner. (Again FIG. 4 shows for clarity only those elements of the programmable execution unit 42 that are relevant to its operation in the manner of the technology described herein. The programmable execution unit 42 may have other elements that are not shown in FIG. 4.

In FIG. 4, the programmable execution unit 42 comprises a single functional unit 50 that is operable to execute instructions 51. As shown in FIG. 4, the output of the functional unit 50 can both be written to the registers 46 and fed back directly as an input to the functional unit by means of a feedback circuit 52 (without activating the register file 46).

Correspondingly, an instruction that is to be executed by the functional unit 50 can select as its inputs either the fed-back output 52 from the execution of the previous instruction, or inputs from the registers 46. In this embodiment, each instruction, as shown in FIG. 4, has two operands, each of which can be selected between one of two register inputs and the fed-back result 52 from the execution of the previous instruction.

FIG. 4 also shows a corresponding group of instructions 53 that is to be executed atomically by the programmable execution unit 42.

As shown in FIG. 4, between each instruction in the group of instructions 53, there is a corresponding register access descriptor 54. Each such descriptor 54 specifies, as shown in FIG. 4, the data values that will be available on the register ports that the functional unit will (if the instruction it is executing so indicates) read for its input values when executing the following instruction, by specifying the register addresses where the relevant data values to be provided by the corresponding register ports should be fetched from.

Correspondingly, the register access descriptor 54 also specifies the register address where the result of the execution of the instruction following the descriptor should be written to (that result is provided to the write port of the register file and written to the write address indicated by the register access descriptor 54).

When executing the group of instructions 53, the programmable execution unit 42 will firstly wait to make sure that any dependencies for the group of instructions to be executed atomically have been met. Any dependencies for the group of instructions 53 are in an embodiment indicated in a header to the group of instructions, so that the programmable execution unit is informed of the dependencies that need to be met before it can execute the group of instructions 53.

Once all the relevant dependencies for the group of instructions 53 has been met, the programmable execution unit 42 will then execute the group of instructions atomically, i.e. without interruption and following a rigid timing.

When executing the group of instructions 53, the programmable execution unit 42 will firstly configure the register file according to the first register access descriptor 54 for the group of instructions, and then execute the first instruction 51, using the input values indicated in that instruction and writing its output to the relevant write address indicated by the register access descriptor.

Once that instruction execution has been completed, the relevant data values according to the next register access descriptor in the sequence will be fetched and provided on the register read ports, and then the next instruction in the group of instructions will be executed, with its result again being written to the corresponding register indicated by the register access descriptor, and so on.

In each case, as shown in FIG. 4, the instruction that is being executed by the functional unit can select as its inputs either data from the register file (by accessing the relevant register port) and/or the result of the previous instruction that is fed back by means of the feedback (bypass) circuit 52.

Once all the instructions of a group of instructions have been executed, the program execution will move to the next group of instructions (if any) for the program and execute that group of instructions atomically in a corresponding manner, and so on, until the program execution has been completed.

Figure 5:
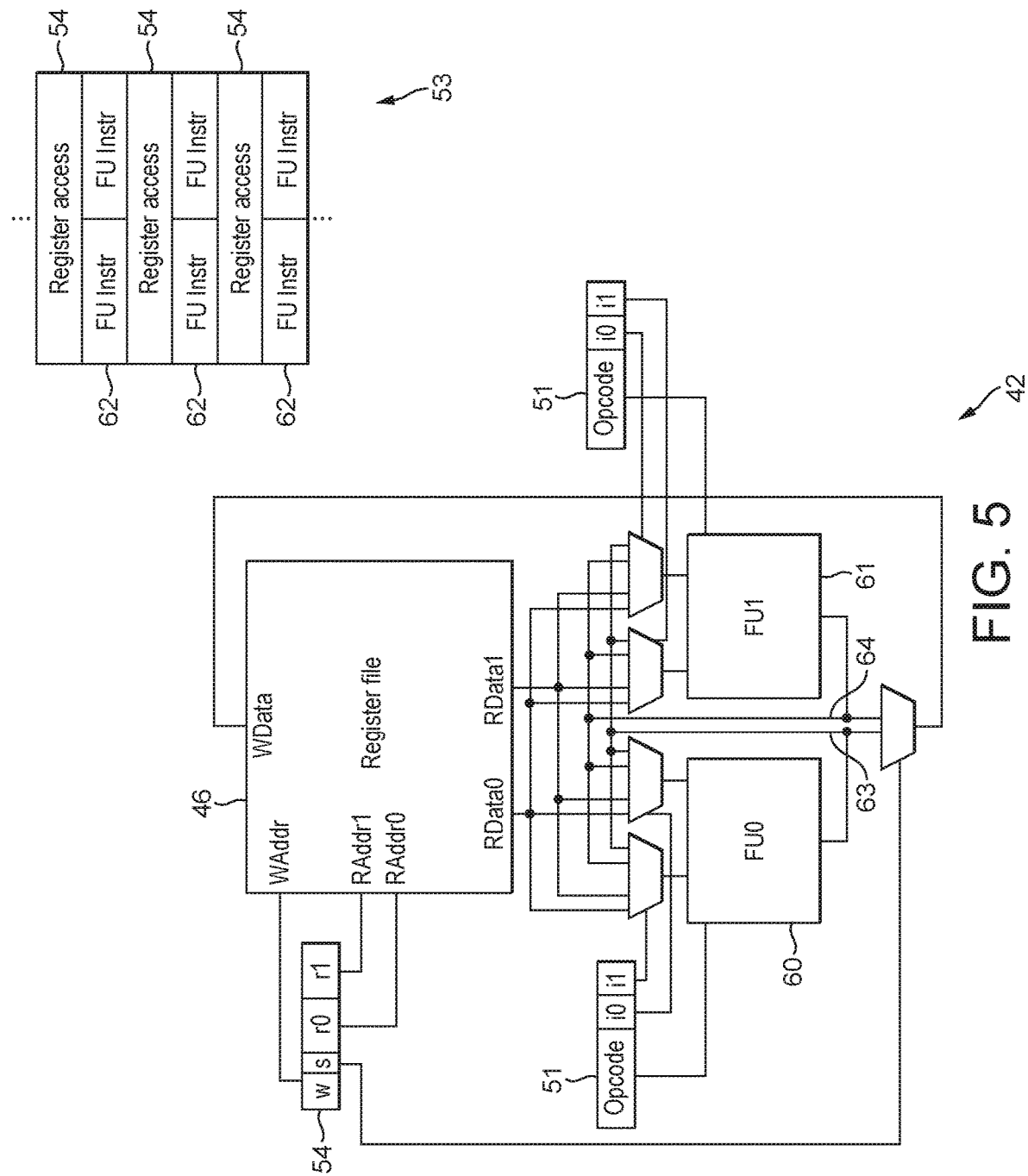
FIG. 5 shows schematically a second embodiment of the programmable execution unit of the graphics processing unit of FIG. 3.

FIG. 5 shows a second embodiment of the programmable execution unit 42. (Again FIG. 5 shows for clarity only those elements of the programmable execution unit 42 that are relevant to its operation in the manner of the technology described herein. The programmable execution unit 42 may have other elements that are not shown in FIG. 5.)

In this embodiment the programmable execution unit 42 includes two functional units 60, 61 that each execute a respective instruction 51 in a given execution cycle. Thus the group of instructions 53 that is to be executed atomically includes a sequence of instruction tuples 62, comprising one instruction for each of the functional units, that are to be executed in the same instruction cycle respectively by each of the functional units 60, 61.

Again, as shown in FIG. 5, the output of each functional unit is fed back by respective feedback circuits 63, 64 so as to be available as an input for the next instruction that is being executed by each of the functional units 60, 61.

Accordingly, the instructions to be executed by the functional units can select as their inputs from the results generated and fed back from executing the previous instruction in either of the functional units, and also data provided from the register file 46.

In the embodiment shown in FIG. 5, it is assumed that only one result can be written back to the registers in any given execution cycle, so as shown in FIG. 5, the programmable execution unit 42 is also operable to select which of the functional units' output results should be written to the register file 46. This is, as shown in FIG. 5, specified in the register access descriptor 54. Other arrangements, such as providing two write ports so that the output of both functional units for an execution cycle can be written to the register file or allowing some combination of the results to be written to the register file 46, would be possible, if desired.

Similarly, it would be possible to provide more register read ports to allow the functional units to select between more input values, and for there to be more than two functional unit(s), etc., as desired.

Figure 6:
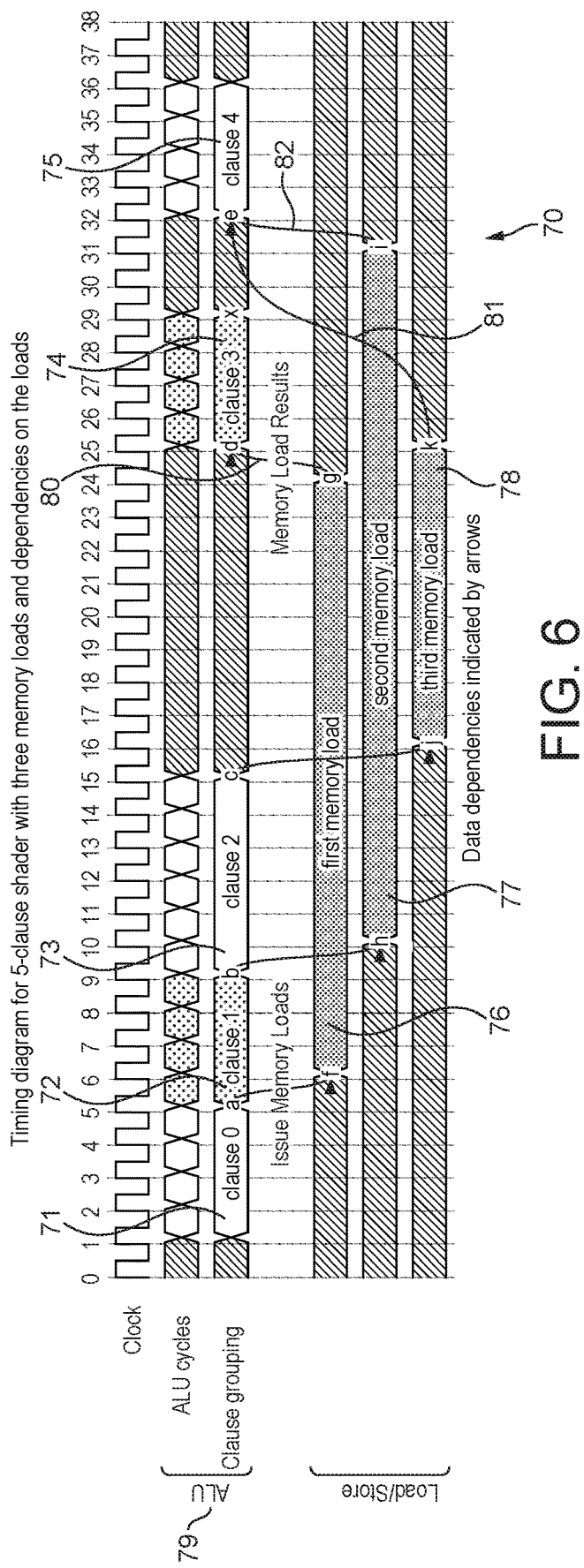
FIG. 6 shows schematically a timing diagram for a shader program.

FIG. 6 shows schematically an example timing diagram 70 for a shader program. Specifically, this timing diagram 70 shows the execution of a shader program with five clauses 71, 72, 73, 74, 75, numbered from 0 to 4. In this example, clauses 0, 1 and 2 (71, 72, 73) issue one memory load each (76, 77, 78), and they have no dependencies among themselves, so they execute back-to-back in an arithmetic logic unit (ALU) 79, and the memory loads 76, 77, 78 are allowed to overlap. Clause 3 (74) on the other hand has a dependency 80: it depends on the first memory load 76, and is therefore held back until the first memory load 76 has completed. Clause 4 (75) has two dependencies 81, 82: it depends on the second and third memory loads 77, 78. As such, clause 4 (75) is held back until both of these two memory loads (i.e. the second and third memory loads 77, 78) have completed.

Memory loads may have unpredictable latencies. In the example in FIG. 6, this is represented by the first and second loads 76, 77 having higher latencies than the third load 78.

Although the present embodiments have been described above with particular reference to the execution of shader programs in graphics processing units, the operation in the manner of the technology described herein and the techniques of the technology described herein are equally applicable to and can be used in other processing units, such as a more general processor, such as a CPU (Central Processing Unit), if desired.

It can be seen from the above, that in its embodiments at least, the technology described herein provides methods of executing programs in programmable execution units of data processing systems that can provide more efficient execution of those programs. This is achieved, in embodiments of the technology described herein at least, by executing groups of instructions in a program to be executed atomically, and by providing the results of the execution of one instruction in the group of instructions directly for use as an input when executing another instruction in the group of instructions.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A programmable execution unit for a data processing unit, the programmable execution unit comprising:
   processing circuitry operable to, when the programmable execution unit is executing a program that comprises a sequence of instructions to be executed by the programmable execution unit,
   execute the instructions of a group of instructions of the sequence of instructions of the program atomically, wherein the processing circuitry comprises a functional unit that is operable to execute one instruction in an execution cycle; and
   a feedback circuit configured to feedback an output from the functional unit executing an instruction in a group of instructions that is being executed atomically directly for use as an input to the same functional unit when the functional unit is executing another instruction in the group of instructions that is being executed atomically.

2. The programmable execution unit of claim 1, wherein the programmable execution unit operates as a programmable graphics shading stage which executes graphics shader programs to perform graphics processing operations.

3. The programmable execution unit of claim 1, wherein the processing circuitry comprises
   plural functional units that each execute one instruction in an execution cycle.

4. The programmable execution unit of claim 1, further comprising circuitry operable to allow an instruction to select the output of a previous instruction that has been fed back from the output of the execution unit as an input when executing the instruction.

5. The programmable execution unit of claim 1, wherein the programmable execution unit is configured such that the result of executing an instruction can be written to a register or registers for storage.

6. The programmable execution unit of claim 1, further comprising circuitry operable to allow an instruction to be executed to select data that is stored in a register in a register file of or accessible to the programmable execution unit as an input when executing the instruction.

7. The programmable execution unit of claim 1, wherein instructions to be executed use an address encoding to indicate their inputs that can only address a local address space that addresses a limited set of input sources.

8. A data processing system, comprising:
   an execution pipeline, the execution pipeline comprising a programmable execution unit that executes program instructions to perform data processing operations; and
   processing circuitry configured to:
   issue to the programmable execution unit of the execution pipeline a program to be executed by the programmable execution unit that comprises a sequence of instructions to be executed by the programmable execution unit when executing the program;
   and wherein:
   the execution pipeline comprises processing circuitry configured to:
   issue one or more execution threads to the programmable execution unit for which the program is to be executed for execution; and
   the programmable execution unit of the execution pipeline comprises:

processing circuitry operable to, when the programmable execution unit is executing a program that comprises a sequence of instructions to be executed by the programmable execution unit, execute the instructions of a group of instructions of the sequence of instructions of the program atomically, wherein the processing circuitry of the programmable execution unit comprises a functional unit that is operable to execute one instruction in an execution cycle; and a feedback circuit configured to feedback the output from the functional unit executing an instruction in a group of instructions that is being executed atomically directly for use as an input to the same functional unit when the functional unit is executing another instruction in the group of instructions that is being executed atomically.

9. The system of claim 8, wherein:

the data processing system processing circuitry is also configured to:

also issue to the programmable execution unit of the execution pipeline register access descriptors that indicate the registers whose values are to be provided as inputs when executing an instruction.

10. A method of operating a programmable execution unit of a data processing unit that executes program instructions to perform data processing operations, wherein the programmable execution unit comprises a functional unit that is operable to execute one instruction in an execution cycle, the method comprising:

the programmable execution unit when executing a program for an execution thread, the program comprising a sequence of instructions to be executed by the programmable execution unit when executing the program:

executing at least one group of instructions of the sequence of instructions for the program atomically; and feeding back an output from the functional unit executing an instruction in the group of instructions that is being executed atomically directly for use as an input to the same functional unit when the functional unit is executing another instruction in the group of instructions that is being executed atomically.

11. The method of claim 10, wherein:

the sequence of instructions for the program to be executed by the programmable execution unit is divided into plural groups of instructions; and the programmable execution unit executes each group of instructions atomically.

12. The method of claim 10, wherein the programmable execution unit operates as a programmable graphics shading stage, and which execute a graphics shader program to perform graphics processing operations.

13. The method of claim 10, comprising:

selecting the output of a previous instruction that has been fed back from the output of the execution unit as an input when executing an instruction.

14. The method of claim 10, comprising:

writing the result of executing an instruction to a register for storage.

15. The method of claim 10, comprising:

using data that is stored in a register in a register file of or accessible to the programmable execution unit as an input when executing an instruction.

16. The method of claim 10, wherein instructions to be executed use an address encoding to indicate their inputs that can only address a local address space that addresses a limited set of input sources.

17. A method of operating an execution pipeline of a data processing system, which execution pipeline includes a programmable execution unit that executes program instructions to perform data processing operations, wherein the programmable execution unit comprises a functional unit that is operable to execute one instruction in an execution cycle, the method comprising:

issuing to the programmable execution unit a program to be executed by the programmable execution unit, the program comprising a sequence of instructions to be executed by the programmable execution unit when executing the program;

issuing one or more execution threads for which the program is to be executed to the programmable execution unit for execution; and executing the program for the execution thread or threads; wherein:

executing the program for the execution thread or threads comprises:

executing at least one group of instructions of the sequence of instructions for the program atomically; and feeding back an output from the functional unit executing an instruction in the group of instructions that is being executed atomically directly for use as an input to the same functional unit when the functional unit is executing another instruction in the group of instructions that is being executed atomically.

18. The method of claim 17, further comprising:

issuing to the programmable execution unit of the execution pipeline register access descriptors that indicate the registers whose values are to be provided as inputs when executing an instruction.

19. A non-transitory computer readable storage medium storing computer software code which when executing on a processor performs a method of operating a programmable execution unit of a data processing unit that executes program instructions to perform data processing operations, wherein the programmable execution unit comprises a functional unit that is operable to execute one instruction in an execution cycle, the method comprising:

the programmable execution unit when executing a program for an execution thread, the program comprising a sequence of instructions to be executed by the programmable execution unit when executing the program:

executing at least one group of instructions of the sequence of instructions for the program atomically; and feeding back an output from the functional unit executing an instruction in the group of instructions that is being executed atomically directly for use as an input to the same functional unit when the functional unit is executing another instruction in the group of instructions that is being executed atomically.

* * * * *